Aug. 18, 1942.                M. A. WINTER                2,293,234
                             MEASURING DEVICE
                           Filed April 9, 1941            3 Sheets-Sheet 1
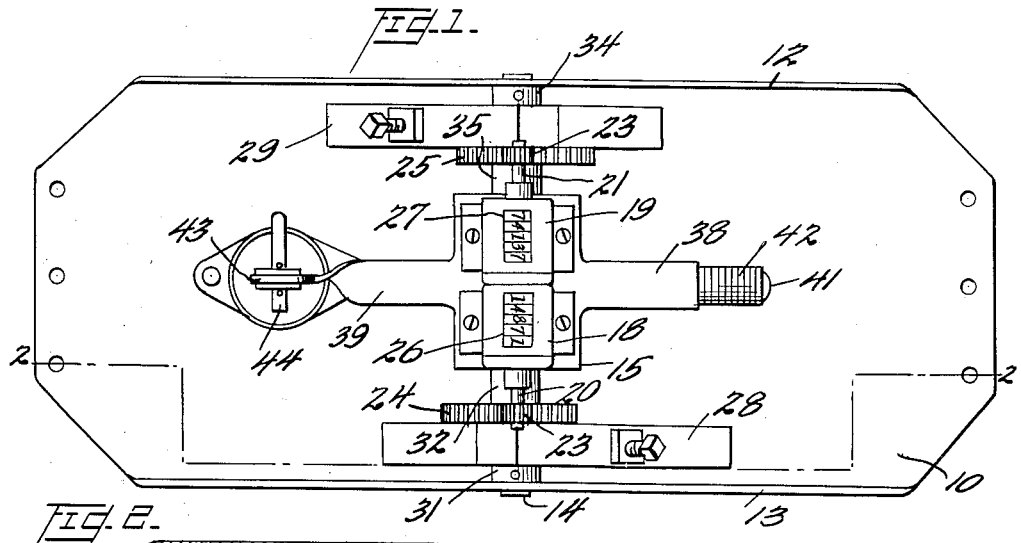
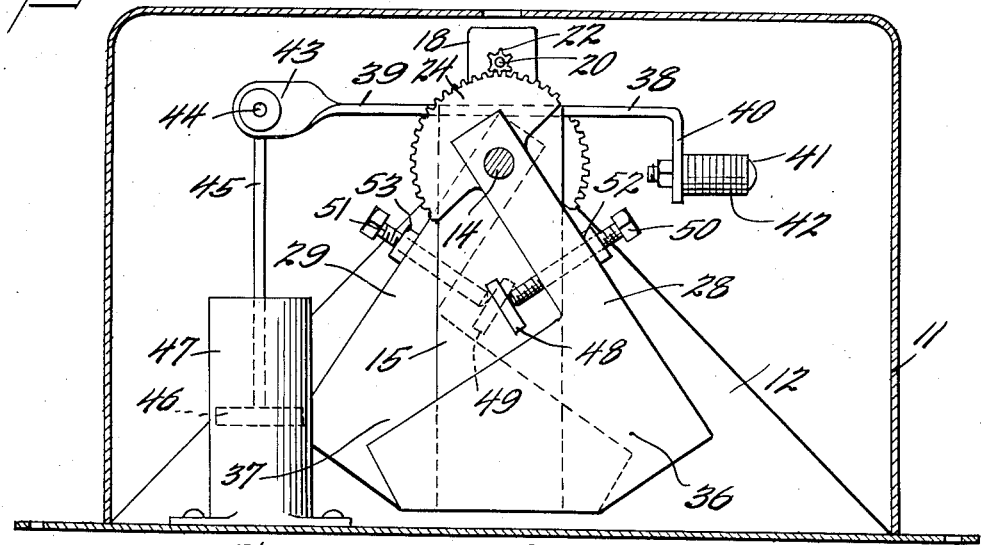
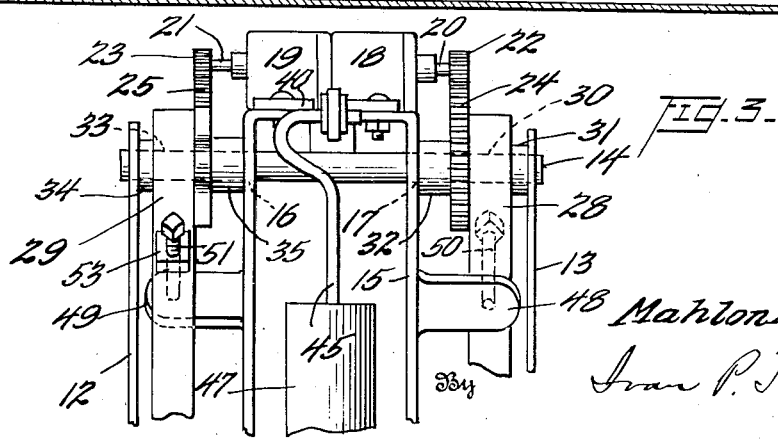
Inventor
Mahlon A. Winter,
Ivan P. Tashof,
By                Attorney

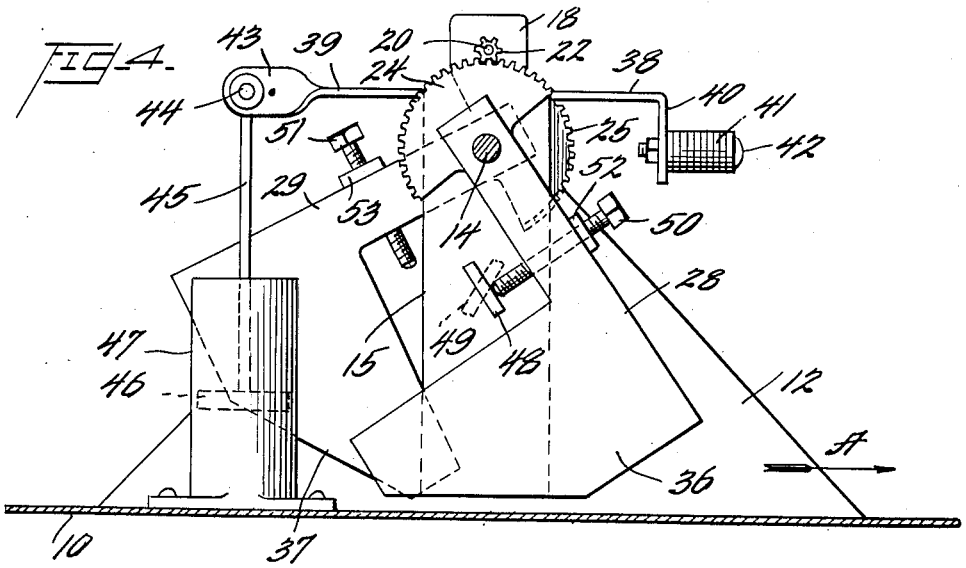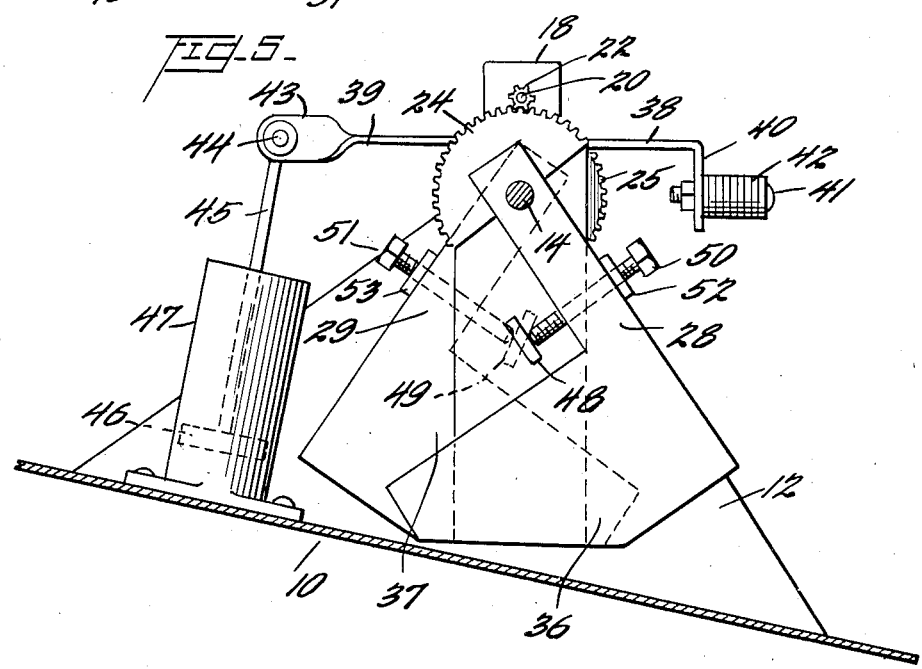

Aug. 18, 1942.     M. A. WINTER     2,293,234
MEASURING DEVICE
Filed April 9, 1941     3 Sheets-Sheet 3
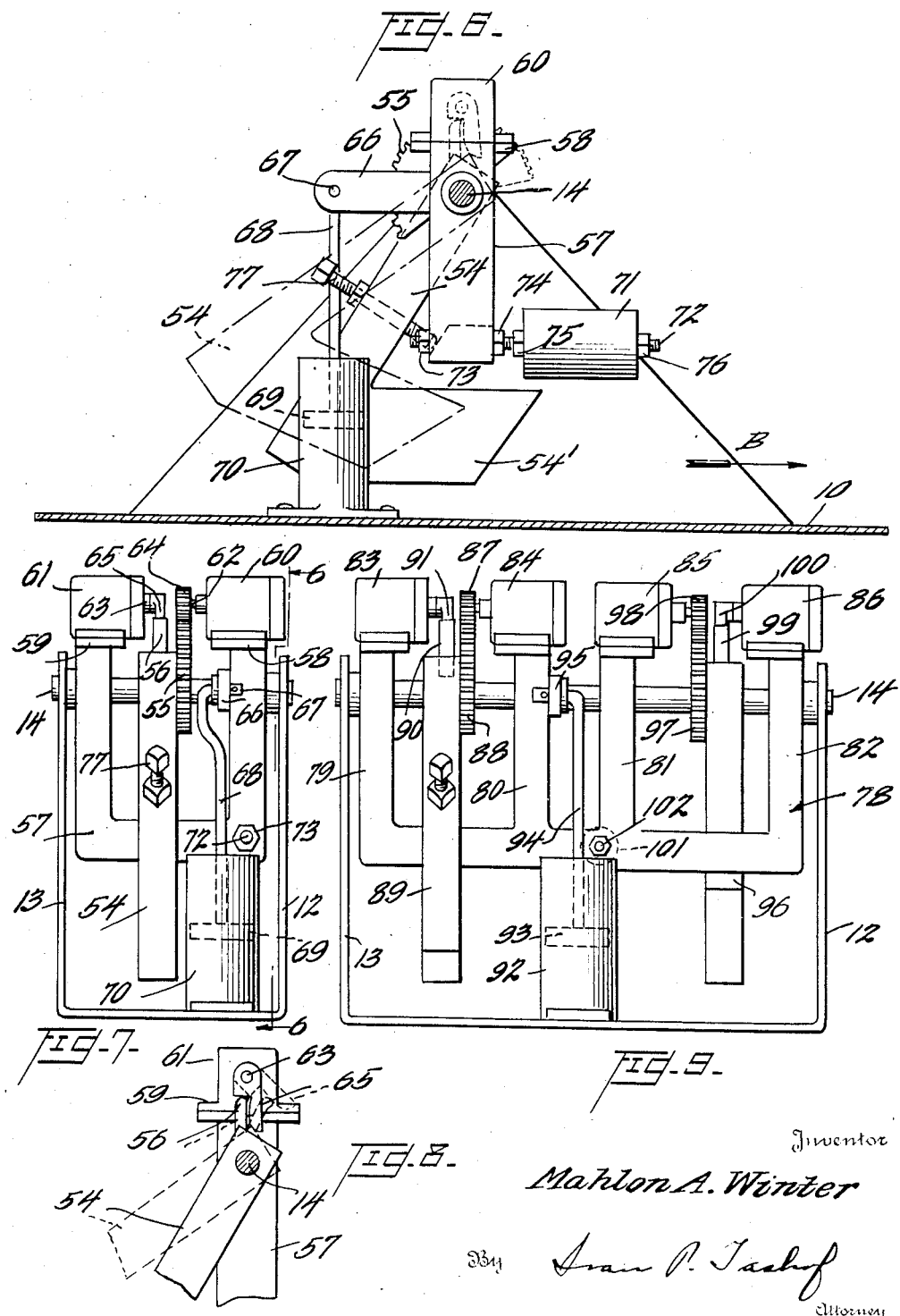
Inventor
Mahlon A. Winter
By [signature]
Attorney Patented Aug. 18, 1942

2,293,234

UNITED STATES PATENT OFFICE 2,293,234

MEASURING DEVICE

Mahlon A. Winter, Chambersburg, Pa.

Application April 9, 1941, Serial No. 387,779

14 Claims. (Cl. 264—1)

The present invention relates to a measuring device. More particularly, the present invention relates to an instrument adapted to indicate and/or make a permanent or semi-permanent record of changes in velocity of moving objects.

Although in the specific embodiment of the invention herein disclosed, a device is shown and described which is capable of registering a number of digits corresponding to various changes in velocity, it is to be understood that a modification of the device in a manner well known to those in the art may obviously be made in order to make a permanent written record or graph, or a non-permanent indication such as that traced on a suitable dial by means of a pointer.

The present device was particularly developed in order to record the ability of a driver or operator of a moving vehicle, as for example, a bus or truck.

However, it is to be understood that the present device is capable of other uses so as to record the operation factors relating to other vehicles.

Further, the device may be used in other capacities to measure similar occurrences.

It has been discovered by research that the rate of change of acceleration and/or deceleration is an important factor in commercial vehicles carrying passengers, insofar as passenger comfort is concerned. However, no effective means has heretofore been known for measuring the amplitude of sudden changes in acceleration. For example, it is highly desirable in determining the ability of an individual operator or driver to be able to ascertain just how quickly the brakes are applied during the course of normal operation.

In the alternative, or in addition thereto, it is also desirable to have some measure of the acceleration rate insofar as this acceleration rate changes with high rapidity.

Previous instruments used in the industry have not truly rated the ability of a driver of a moving vehicle, as for example, a truck or bus, because they were incapable of measuring anything except limited changes in velocity and particularly the total rate of change of the velocity or acceleration.

In instruments of this character, the time factor involved was not truly evaluated and compared against the velocity changes because these devices were incapable of indicating or measuring the true disturbing effects of horizontal forces on the passengers and equipment of the vehicle.

In disregarding both the rate of change of the acceleration and the magnitude of that change, as well as the time interval over which the change took place, prior art instruments could not indicate accurately the disturbing effects of horizontal forces on the passengers and equipment of the vehicle. High rates of acceleration are often desirable and can be achieved without undue disturbance if the rate of change of the acceleration is proper and other factors just mentioned are properly correlated. This is in sharp contrast to sudden stops and jerks in starting which involve not only a high rate of acceleration or deceleration, but an extremely high change in the rate of acceleration or deceleration over a relatively small interval of time.

In the design of instruments of the character described, in general, it is difficult to distinguish between acceleration and deceleration, and changes in inclination of the vehicle occasioned by going up and down hills.

It is one of the objects of the present invention therefore to provide a measuring instrument capable of making a record of any excessive change in acceleration and/or deceleration.

Another object of the present invention is to provide an instrument capable of registering or recording the amplitude of a large number of changes in acceleration and/or deceleration.

Still another object of the present invention is to provide an instrument capable of registering or recording the total number of changes in acceleration or deceleration, above a predetermined factor.

A fourth object of the present invention is to provide an instrument capable of registering and/or recording both the amplitude of changes in acceleration and/or deceleration factors above a given quantity and the total number of changes of this nature.

A fifth object of the present invention is to provide a device of the character described in which compensation is made for changes in inclination of the vehicle in which the instrument is mounted.

A sixth object of the present invention is to provide in a device of the character described a single compensating means, capable of discounting the effects of a varying inclination in the recording of changes in acceleration and/or velocity within a given desirable range.

Other objects and advantages will become apparent from the subsequent description and figures of the drawings, wherein:

Figure 1 is a plan view of the recording device according to the present invention with the outer cover thereof removed;

Fig. 2 is a transverse section taken along the line 2—2 of Fig. 1;

Fig. 3 is an end elevation of a portion of the device;

Fig. 4 is a view similar to Fig. 2, with one of the operating masses in operative relation;

Fig. 5 is a view similar to Figures 2 and 4, illustrating the positioning of the various parts due to a change in inclination;

Fig. 6 is a transverse section of the modified device taken along the line 6—6 of Fig. 7;

Fig. 7 is an end elevation of the device of Fig. 6;

Fig. 8 is a detail of the device of Figures 6 and 7;

Fig. 9 is an end elevation of a further modification.

Referring to the drawings and particularly to Figures 1 and 2 thereof, a base plate is indicated at 10 having a suitable cover as indicated at 11.

The side edges of the base plate are turned at right angles to the plate proper to form a pair of supporting standards 12 and 13.

Fixed within the standards 12 and 13 is a stationary rod or pivot member 14, as shown in Figure 3 supported at each of its ends by the standards 12 and 13.

Hung from the rod 14 and mounted to rotate thereon is a U-shaped frame member 15 which is provided with a pair of openings in each of its legs indicated at 16 and 17 to receive the rod 14.

Bolted to the upper horizontal portion of the member 15 is a pair of indicating devices of a conventional character 18 and 19, provided with the operating shafts 20 and 21 respectively.

The operating shafts 20 and 21 are provided at their outer ends with the pinions 22 and 23, which are adapted to mesh with the gear segments 24 and 25 respectively.

The counters 18 and 19 are of a conventional type which are adapted to register in one direction only. In other words, rotation of the pinions 22 and 23 in one direction will change the reading at the indicator openings 26 and 27, and subsequent rotation of the pinions 22 and 23 in a reverse direction will not in any way affect the indications.

Inasmuch as this type of counter is conventional in the art, it is not believed necessary to describe the mechanism thereof in detail.

The gear segments 24 and 25 are fixedly mounted to rotate with the pendulum members 28 and 29 respectively.

The pendulum member 28 is provided with an opening through the upper part thereof and through the gear segment 30 through which the supporting rod 14 is adapted to extend.

It is to be understood that the pendulum 28 is freely rotatable or swingable about the rod 14 and that when it rotates about the rod the gear segment 24 is similarly moved.

The pendulum 28 is spaced from standard 13 by bushing or collar 31 which prevents endwise movement of the pendulum upon the rod 14 in one direction and is similarly spaced from the frame 15 by a second bushing 32 which prevents endwise movement in the other direction.

The pendulum 29 is also mounted in a rotatable manner at the other end of the rod 14, the rod 14 passing through the opening 33 in the pendulum 29 and the gear segment 25, which is integral with the pendulum 29.

The pendulum 29 and gear segment 25 are spaced from the standard 12 and the frame 15, respectively, by the bushings 34 and 35 which prevent endwise motion of the pendulum 29 and gear segment 25 on the rod 14.

Each of the pendulums 28 and 29 is provided with a relatively large lower end 36 and 37, respectively, which are adapted to furnish the necessary mass for actuation of the pendulums, as will be hereinafter described in detail. The frame 15 is provided with a pair of transversely extending projections, 38 and 39. The projecting portion, 38, is turned downwardly to form a portion 40 adapted to support, as by the bolt 41, a plurality of counter-balancing weights indicated at 42. It is therefore understood that the weights 40 which may be ordinary washers, are provided with an opening in their centers to receive the bolt 41. The projection 39 is twisted to form a supporting portion 43 extending in a generally vertical plane. Portion 43 has an opening therein for rotatably receiving a portion 44 of a rod 45. Fastened to the bottom of the rod 45 in any suitable manner, is a conventional type of piston member indicated at dotted lines in Figures 2, 4 and 5, adapted to cooperate with the cylinder 47 to form a dash pot or retarding means for the frame 15.

As shown in Figure 2, the pendulums 28 and 29 are adapted to normally rest or bear against stops 48 and 49 on the frame 15. The pendulums 28 and 29 do not rest directly against the projections, but are provided as shown with bolts 50 and 51 which extend transversely through the pendulums and bear against the stops 48 and 49 at their lower ends. These bolts therefore provide means to adjust the position of the pendulums relative to the stops. It is to be understood that the bolts 50 and 51 are threaded through the pendulums 28 and 29 respectively and therefore by screwing the bolts inwardly and outwardly, the position of the pendulums relative to the stops 48 and 49, and the frame 15, may be adjusted.

Suitable locking nuts may be provided for the bolts 50 and 51, these locking nuts being indicated at 52 and 53 respectively.

Referring to Figure 4, it will be noted that the pendulum 29 is here shown rotated away from its stop 49. Such rotation will be produced by rapid change of acceleration in the direction indicated by the arrow "A". In other words, if the entire measuring device were positioned in the vehicle and the vehicle and measuring device were subjected to a rather rapid change of movement or acceleration in the direction of the arrow, the pendulum 29 would be swung in the position indicated in Figure 4. It is to be understood that lesser changes in acceleration would move the pendulum 29 to a lesser degree. However, if the change in acceleration is less than a pre-determined amount, pendulum 29 will not move away from its stop, but the entire assembly including the frame 15 and the piston 46 will move about the rod 14.

This will occur rather than movement of the pendulum 29 whenever the increase in the rate of acceleration does not tend to move pendulum 29 any faster than the dash pot 47 allows the entire frame 15 to move.

Inasmuch as the counter proper, together with the pinion 23 is mounted on the frame 15, there will be no relative movement of the gear segment 25 and the pinion 23 such as that indicated in Figure 4, and no actuation of the counter will take place under this latter condition.

It is obvious that the dash pot can be adjusted or proportioned to allow the entire assembly, the pendulums and frame 15 to swing in response to any distinct change in the acceleration. In other words, in the operation of the present device, the amount of change capable of actuating in the pendulum 29 may be varied to any desired degree. Obviously the pendulum 28 will swing away from its stop 48 whenever an excessive amount of change in acceleration occurs in a direction opposite to the arrow "A". That is, if a change in acceleration in the direction of the arrow "A" is considered to be true acceleration, the pendulum 28 will be actuated upon the undesirable change in deceleration.

The function of the dash pot in preventing undesirable indications when the vehicle in which the device is mounted is proceeding down a steep grade is illustrated in Figure 5. As shown in this figure, the pendulums 28 and 29 in the frame 15 have remained in their original position, but the dash pot 47 has permitted the movement of the piston therein so that the base 10 of the device is tilted at an angle relative to the remaining portions of the mechanism. Inasmuch as there has not been any movement of the pendulums 28 and 29 relative to the frame 15, it is evident that neither one of the gear segments 24 or 25 has rotated either one of the pinions 22 or 23 to operate the indicating devices 26 and 27.

Referring to Figure 6, there is here shown a modification of the present invention adapted to record or register not only the amplitude of acceleration changes in excess of a certain predetermined quantity, but also the number of such changes. The device of Figure 6 is provided with a base 10, entirely similar to the base 10 in Figures 1 to 5 inclusive, and a pair of supporting standards 12 and 13 also entirely similar in character and function. A similar supporting rod 14 fixed in the standards 12 and 13 is also present. Only a simple pendulum is here provided, however, desirably different in shape. Thus the pendulum 54 of this modification is provided with a mass 54' desirably of the shape indicated, in order to permit efficient operation and balancing.

The pendulum 54 is mounted for free rotatable movement on the rod 14. The upper portion of the pendulum 54 carries a gear segment 55 which is adapted to move with the pendulum and a nose 56 which is also adapted to move with the pendulum as indicated in dotted lines in Figure 8.

A somewhat differently shaped frame 57 is mounted for rotation on the rod 14 and is provided with a pair of supporting portions 58 and 59 adapted to support the counters 60 and 61 respectively. The counters 60 and 61 are also the conventional type similar to counters 26 and 27 and are adapted to be operatable in only a single direction by means of the counter shafts 62 and 63 respectively. The counter shaft 62 carries the pinion 64 which is adapted to mesh with the gear segment 55. The counter shaft 63 carries cam 65 which is adapted to cooperate with the nose 56 of the pendulum 64 and is adapted to be given certain definite movement in a counter-clockwise direction whenever the pendulum nose 56 moves in a clockwise direction. This movement of the cam 65 is shown in Figure 8.

It is evident from Figure 8 that the amount of movement transmitted to the counter 61 by the pendulum 54 is definitely circumscribed. In other words, whenever the nose 56 has moved to the dotted line position shown in Figure 8, any further movement of the pendulum 54 will have no further effect on the cam 65 and the counter 61. The counter 61 will therefore record once for each movement of the pendulum 54, and will not be affected by any amplitude of movement beyond the amount necessary to make a single recording for each movement.

The counter 60, on the other hand, will continue to be actuated to a greater or lesser degree depending on the amplitude of movement of the pendulum 54 through the instrumentality of the gear segment 55 and pinion 64, this action being similar to that described in connection with the modification of the device shown in Figures 1 to 5, inclusive.

The frame 57 of the instant device is also provided with a lateral projection 66 adapted to receive the bent portion 67 of a piston rod 68 suitably connected to the piston 69, reciprocating in the dash pot 70. The lower portion of the frame 57 is provided also with a relatively large counterweight 71 supported on the frame by the relatively long bolt 72. As shown, the bolt is fixed relative to the frame 57 as by the nuts 73 and 74, and the weight 71 is fixed relative to the bolt by the nuts 75 and 76. The function of the relatively large counterweight 71 is to compensate for the weight of the single pendulum 54. It is evident, therefore, that the counters 60 and 61 will only be actuated by changes in acceleration in direction of the arrow "B" which exceed a predetermined quantity, these changes in acceleration producing a rotation or a swing of the pendulum 54 to the position indicated in dotted lines in Figure 6. If the changes in acceleration are sufficiently small to permit the entire frame 57, even though retarded by the dash pot, to move, it is evident that there will be no relative movement of the gear segment 55, and the pinion 64, and similarly there will be no relative movement between the nose 56 and the cam 65.

As shown in Figure 6, when the pendulum 54 is in its normal position, the bolt 77 rests against the lower portion of the frame 57. Since the bolt 77 is threaded through the pendulum 54, it is evident that the position of the pendulum relative to the frame when the pendulum is in a quiescent state, can be modified by screwing the bolt 77 inwardly and outwardly relative to the pendulum.

In Figure 9, a further modification of the device of Figures 6 to 8, inclusive, is shown, which is capable of registering both acceleration and deceleration changes above a certain amount, and the number of changes of this character. As shown in this figure, the frame 78 pivoted about a rod 14 similar in character to that previously described, is provided with four supporting portions, 79, 80, 81, and 82, respectively for four counters 83, 84, 85, and 86, respectively. It will be noted that the left-hand portion of the frame 78, including the supporting portions 79 and 80, is entirely similar in function and appearance to the device shown in Figure 7. In other words, the supporting portions 79 and 80 carry the counters 83 and 84 for actuation in a manner similar to the counters 60 and 61, previously described. Projecting from the counter 84 is a pinion 87 which is adapted to be rotated by a gear segment 88 on the pendulum 89 in a manner similar to the rotation of the pinion 64 by the gear segment 55 of Figure 7.

The pendulum 89 also carries a nose 90 which is adapted to cooperate with the cam 91 shaped like the cam 65 of Figure 8. It is also to be understood therefore that the nose 90 rotates the cam 91 which in turn actuates the counter 83 and that this action is equivalent to the actuation of the counter 61 by the nose 56 and the cam 65.

The entire frame 78 is adapted to be retarded insofar as swing is concerned, by a dash pot 92 having a piston 93, as shown in dotted lines in Figure 9, and connected to the frame 78 by a rod 94; the rod 94 as shown, being pivotally connected to an arm 95 at its upper end.

The right-hand portion of the structure shown in Figure 9 also functions in a similar manner to the structure in Figure 7. However, the pendulum 96 which actuates the counters 85 and 86, is pivoted to swing in a diverse direction as compared to the pendulum 89. In other words, if the device of Figure 9 were positioned in a vehicle so that the pendulum 89 is adapted to measure acceleration factors above a certain amount then the pendulum 96 will be adapted to measure deceleration phenomena. The pendulum 96, it is to be noted, is adapted to actuate the counter 85 by means of the gear segment 97 carried by the pendulum. The gear segment 97 is adapted to mesh with a pinion 98, which as shown, projects from the counter and functions as the actuating means therefor. The pendulum 96 also carries a nose 99 which is adapted to bear against a cam 100 fixed on the counter shaft, projecting from the counter 86. Here again the actuation of the counters 85 and 86 is entirely similar to the actuation of the counters 60 and 61 described in connection with Figure 7, except that the effective direction of actuation is reversed.

A suitable counter-balancing means may also be provided for the frame 78. This means is indicated in dotted lines at 101 and is supported on the frame as by a bolt indicated at 102. It is to be therefore understood that the weight 101 is preferably similar in character to the weight 71 of Figure 6 and is mounted for movement and adjustment on the bolt 102. In this connection, however, it is desired to point out that the weight 101 in most instances may be lighter than the weight 71 inasmuch as the presence of the two pendulums 96 and 89 on a single supporting frame 78 is inherently a more balanced structure than the single pendulum suspended from the frame 57 as disclosed in Figures 6 and 7.

Although in the previous description the terms velocity, changes in velocity or acceleration and rate of change in acceleration have been used rather loosely it is desired to point out that these terms are in no sense limiting, and that the device herein described is capable of measuring the disturbing effect of horizontal velocity changes experienced by human beings riding in the vehicle in which the instrument is located. In other words, it has been determined experimentally that human beings are adversely affected by relatively high accelerations, and relatively high changes in acceleration. Once a high velocity is achieved there is no effect on the human body within normal limitations. In the present instrument the pendulum or mass constituted by the supporting frame structure carrying the counters is given retardation or drag by the dash pot which is broadly equivalent to the normal adjustment of the muscles of the human body when riding in the vehicle carrying the instrument. Of course, the dash pot or other retarding means which may be used can be adjusted to correspond to varying degrees of tolerance or be allowed to reciprocate to an amount corresponding to the amount of change in velocity or rate of change of acceleration which is considered permissible as proven by actual experience.

Under these circumstances, any indication which is measured by the indicating devices and which corresponds to the difference in movement of the frame and piston assembly represents an increment over the permissable acceleration and/or velocity change which is desirable.

It is obvious that the frame carrying the counting devices may be retarded by any suitable means. Thus, in the place of a dash pot in some instances a simple air propeller may be suitable, or a clockwork mechanism used which will permit the movement of the frame within a relatively steady rate.

Although the indicating device herein shown consists of a simple conventional counter, it is obvious that a permanent record or graph may be made by mounting a suitable scribing instrument such as a pen or pencil, on one of the freely movable pendulums and a chart or index on the retarded frame so that a trace will be made corresponding to the difference in movement.

Momentary indication rather than the register of digits may also be made in a somewhat similar manner, thus either one of the freely moving pendulums hereinabove described may carry a pointer and a retarded frame, a scale. Obviously the movement of the pointer relative to the scale will also be indicative of the difference in movement between the retarded frame and the freely moving pendulum occasioned by high changes in velocity and by relatively high changes in acceleration.

It is to be understood also that, although in the preferred embodiment of the invention the indicating devices are disclosed as supported by the retarded mass or pendulum, and the actuating means for the indicating devices on the freely moving pendulum, that this structure may be reversed, i. e., the indicating devices themselves carried as, for example, on one of the pendulums 29—36 in place of the gear segments 24—25 and the gear segments carried on the retarded mass or pendulum 15, so that the same difference in movement between the masses will be measured.

What is claimed, is:

1. In a device for measuring changes in velocity, a mass constructed and arranged for movement upon a change in velocity, a second mass similarly constructed and arranged for simultaneous movement upon a change in velocity, retarding means connected to said second mass, said retarding means having a pre-determined resistance to free movement to thereby prevent movement of said second mass in response to relatively large velocity changes while permitting movement of said mass in response to relatively smaller velocity changes, and an indicating device adapted to measure the difference in movement between the aforesaid masses.

2. In a device for measuring changes in velocity having a disturbing effect on the equilibrium of human beings, a pair of masses suspended for similar movement when subjected to a velocity change, a retarding means having a predetermined response to free movement and connected to one of said masses for permitting movement thereof corresponding to a restricted range of velocity change and retarding the movement thereof beyond said range, and an indicating device adapted to measure the difference in movement between each of said masses.

3. In a device for measuring changes in velocity, a mass constructed and arranged for movement upon a change in velocity, a second mass similarly constructed and arranged for movement upon a similar change in velocity, a dash pot connected to said second mass and adapted to retard the movement thereof to thereby prevent movement of said second mass in response to relatively large velocity changes while permitting movement of said mass in response to relatively smaller velocity changes, and an indicating device adapted to measure the difference in movement between the aforesaid masses.

4. In a device for measuring changes in velocity, a pendulum carried on a pivot axially transverse to the normal direction of movement of said device, a second pendulum similarly pivoted so that each of said pendulums will move upon a change in velocity of said device, retarding means connected to said second pendulum, said retarding means having a pre-determined resistance to free movement to thereby prevent movement of said second pendulum in response to relatively large velocity changes while permitting movement of said second pendulum in response to relatively small velocity changes, and an indicating device adapted to measure the difference in movement between the aforesaid pendulums.

5. In a device for measuring changes in velocity, a pendulum carried on a pivot axially transverse to the normal direction of movement of said device, a second pendulum similarly pivoted so that each of said pendulums will move upon a change in velocity of said device, a dash pot connected to said second pendulum and adapted to retard the movement thereof to thereby prevent movement of said second pendulum in response to relatively large velocity changes while permitting movement of said pendulum in response to relatively smaller velocity changes, and an indicating device adapted to measure the difference in movement between the aforesaid pendulums.

6. In a device for measuring changes in velocity, a freely rotatable mass positioned for movement upon a change in velocity, a second mass similarly constructed and arranged for simultaneous movement upon a change in velocity, means connected to said second mass to damp the movement thereof to thereby prevent movement of said second mass in response to relatively large velocity changes while permitting movement of said mass in response to relatively smaller velocity changes, and an indicating device adapted to measure the difference in movement between the aforesaid masses.

7. In a device for measuring changes in velocity, a mass constructed and arranged for movement upon a change in velocity, a second mass similarly constructed and arranged for simultaneous movement upon a change in velocity, a retarding means connected to said second mass, said retarding means having a pre-determined resistance to free movement, and an indicating device adapted to register a difference of movement of said masses including a registering means movable with the second mass and an actuating means therefor movable with the first mass so that velocity changes below a predetermined amount will move both the registering means and the actuating means and velocity changes greater than a pre-determined amount will produce a greater movement of said actuating means as compared to said registering means.

8. In a device for measuring changes in velocity, a pendulum pivoted to move with a velocity change, a second pendulum similarly pivoted to move in the same direction as the first pendulum with velocity change, an indicating device carried by said second pendulum and an actuating means for said indicating device carried by the first pendulum, and a retarding means having a pre-determined resistance to free movement connected to said second pendulum to retard the movement of the second pendulum and the indicating means to thereby effect the actuation of the indicating means by said actuating means.

9. In a device for measuring changes in velocity, a mass constructed and arranged for movement upon a change in velocity in one direction, a second mass constructed and arranged for movement upon a change in velocity in a second direction, a third mass constructed and arranged for movement upon a change in velocity in either direction, retarding means connected to said third mass, said retarding means having a pre-determined resistance to free movement, an indicating device adapted to measure the difference in movement between said first and third masses and a second indicating device adapted to measure the difference between said second and third masses.

10. In a device for measuring changes in velocity, a mass constructed and arranged for movement upon changes in velocity, in one direction, a second mass constructed and arranged for movement upon a change in velocity in a second direction, a third mass constructed and arranged for movement upon a change in velocity in either direction, a retarding means connected to said third mass, said retarding means having a predetermined resistance to free movement, an indicating device including a registering means movable with the third mass, and an actuating means therefor movable with the first mass, and a second indicating means including a registering means movable with the third mass and an actuating means therefor movable with the second mass.

11. In a device for measuring changes in velocity, a pendulum pivoted to move with a velocity change in one direction, a second pendulum similarly pivoted to move with a velocity change in another direction, a third pendulum similarly pivoted to move with a velocity change in either direction, an indicating device carried by the first pendulum, and a retarding means having a pre-determined resistance to free movement connected to said third pendulum to retard the movement of the third pendulum in either direction to thereby retard the movement of both of said indicating means and effect relative movement of the actuating means thereto to operate said indicating means upon a relatively rapid movement of either of the first or second-mentioned pendulums.

12. In a device for measuring changes in velocity, a mass constructed and arranged for movement upon a change in velocity, a second mass similarly constructed and arranged for simultaneous movement upon a change in velocity, a retarding means connected to said second mass, said retarding means having a pre-determined resistance to free movement, and a pair of indicating devices, one of said devices being adapted to measure the total difference in movement between the aforesaid masses and the second indicating device being adapted to measure a portion of the difference in movement between the aforesaid masses.

13. In a device for measuring changes in velocity, a mass constructed and arranged for movement upon a change in velocity in one direction, a second mass constructed and arranged for movement upon a change in velocity in a second direction, a third mass constructed and arranged for movement upon a change in velocity in either direction, a retarding means connected to said third mass, said retarding means having a predetermined resistance to free movement, a first indicating device adapted to measure the total difference in movement between said first and third masses, a second indicating device adapted to measure a portion of the difference in movement between said first and third masses, a third indicating device adapted to measure the total difference in movement between said second and third masses, and a fourth indicating device adapted to measure a portion of the difference in movement between said second and third masses.

14. In a device for measuring changes in velocity, a mass constructed and arranged for movement upon a change in velocity, a second mass similarly constructed and arranged for simultaneous movement upon a change in velocity, a retarding means connected to one of said masses, said retarding means having a predetermined resistance to free movement, an indicating device including a registering means movable with one of said masses, and an actuating means therefor movable with the other of said masses, so that said indicating device will measure the difference in movement between the two masses.

MAHLON A. WINTER.